(No Model.)
C. H. DENISON.
FILTERING APPARATUS.
No. 402,147. Patented Apr. 30, 1889.
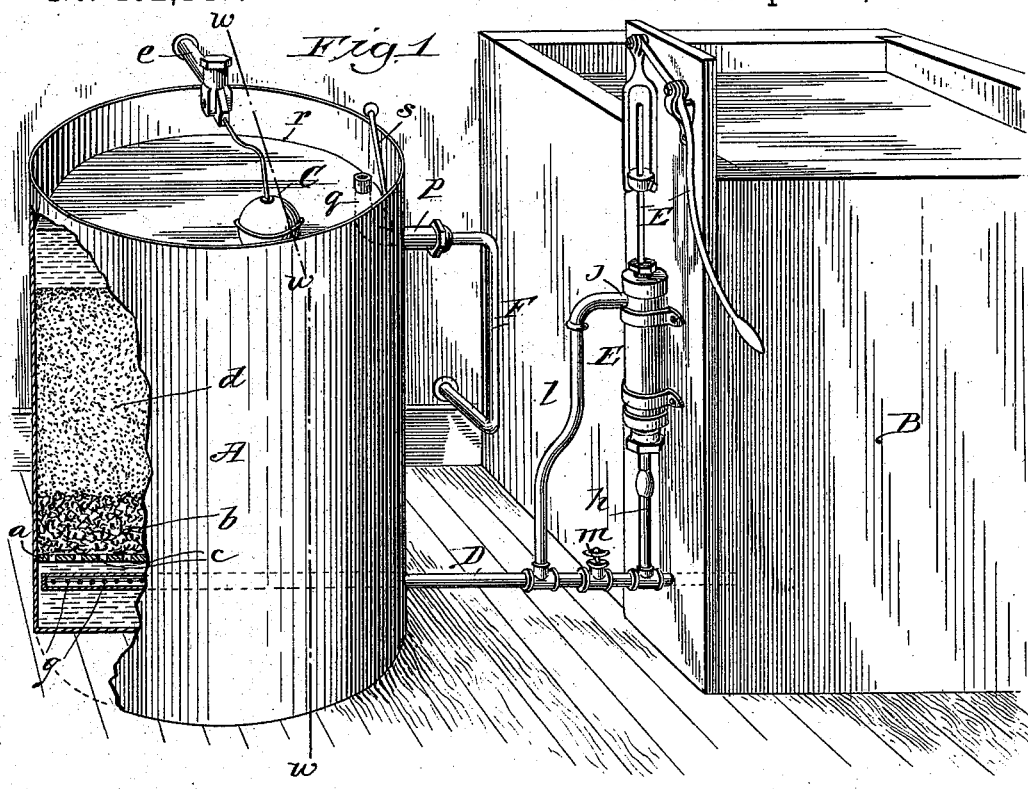
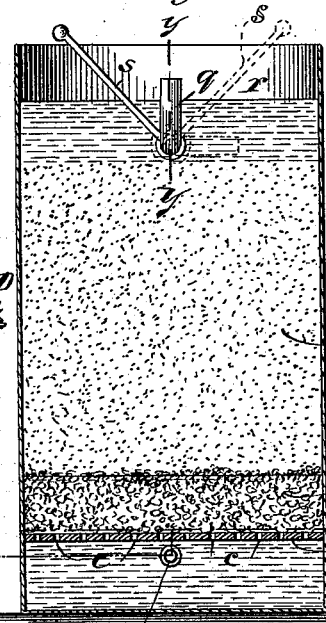
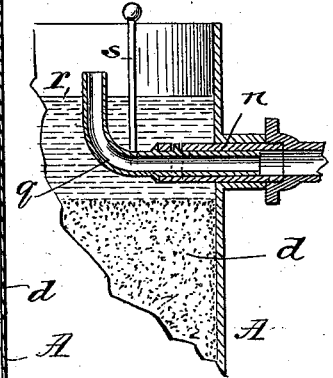
Witnesses:
Inventor,
Cha's H. Denison,
By Chapin
Atty's

UNITED STATES PATENT OFFICE.

CHARLES H. DENISON, OF SPRINGFIELD, MASSACHUSETTS.

FILTERING APPARATUS.

SPECIFICATION forming part of Letters Patent No. 402,147, dated April 30, 1889.

Application filed January 14, 1889. Serial No. 296,320½. (No model.)

*To all whom it may concern:*

Be it known that I, CHARLES H. DENISON, a citizen of the United States, residing at Springfield, in the county of Hampden and State of Massachusetts, have invented new and useful Improvements in Filtering Apparatus, of which the following is a specification.

This invention relates to a liquid-filter particularly intended to be employed in connection with the water system of a dwelling-house or other building, although the same is, as will hereinafter appear, applicable for use in many other places; and under the invention large quantities of water may be filtered and purified, the same being automatically supplied to the filter for purification and delivered after filtration to a receiving-tank therefor. The filtering medium may, as occasion requires, be cleansed with water which has been filtered, and the water employed for so cleansing the filtering medium, together with the foreign matter which has been expelled from said filtering medium, may be discharged from the filtering-tank and conveyed away as waste; and the invention consists in the construction of various utensils and devices and in their co-operative combination with relation to each other, all substantially as will hereinafter fully appear, and be set forth in the claims.

Reference is to be had to the accompanying drawings, forming part of this specification, in which similar letters of reference indicate corresponding parts in all the views.

Figure 1 is a perspective view of the filtering apparatus, with a portion being broken out and in vertical section for more clear illustration. Fig. 2 is a vertical section of the filter-tank on the line $w\ w$, Fig. 1. Fig. 3 is a horizontal cross-section of the filter-tank on the planes indicated by the line $x\ x$, Fig. 2; and Fig. 4 is a vertical section in detail on the line $y\ y$, Fig. 2, to be hereinafter particularly referred to.

In the drawings, A represents a filter-tank, and B a cistern to which the water after being filtered is conveyed, said cistern B being usually the service-cistern located on an upper floor in the building, and to the filter-tank the supply is had and automatically controlled at a proper height by the ball-cock C, of ordinary construction, applied in the usual manner upon an inlet and supply pipe, $e$, from the water-main.

The filter-tank is provided at a short distance above its bottom proper with a supplemental or false bottom, $a$, having a series of perforations, $c$, therein, above which is a filtering medium—as, for instance, a stratum of gravel, $b$, superposed by a stratum or column of considerable height of ground quartz, $d$, and between the top of said finer filtering medium and the plane of the top of the tank is a considerable space to permit always the disposition therein of a quantity of water, the level thereof and that in the cistern being normally uniform and regulated by the said ball-cock. A pipe, D, leads from the space below the said false bottom of the filter-tank to the interior of the said cistern at or near its bottom, said pipe being preferably projected across the diameter of the tank and provided with a series of perforations, $g$, as shown.

E represents a pump, the inlet-pipe $h$ to which is connected with and enters the pipe D at its portion toward the cistern, and at the outlet $j$ of said pump a pipe, $l$, is connected leading to enter the said pipe D toward the filter-tank, and between the place of connection of said pipes $h$ and $l$ with the pipe D the said pipe D is provided with a valve, $m$, for closing its passage thereat.

A radial opening, $n$, is formed through the side of the filter-tank at a point near the top of the filtering-bed, at and about which opening a hollow boss, $p$, is formed on or attached to the tank, and within which boss one end of an angular pipe, $q$, fits for rotation, said angular pipe standing normally with its open end above the water-line $r$, as shown; but said pipe may, through its handle $s$, or in any other convenient manner, be turned to present its open end below the water-line to lie near or upon the top of said filtering material $d$, and to the said hollow boss $p$ a waste-pipe, F, leads to deliver to any desired place, as to a soil-pipe or eaves-gutter.

As water is withdrawn from the cistern B, it is replaced by water from the filter-tank, the ball-cock being at such time automatically opened, so remaining until the maximum water-line in the cistern is reached, when the supply to the filter-tank is cut off. The water entering the filter-tank passes through the filtering strata $d b$, through the perforated false bottom $a$ and pipe D, to said cistern, the valve $m$ at such time being open.

From time to time, as occasion may require that the filtering medium be cleansed, the valve $m$ is closed, and water already filtered is pumped from the cistern, through pipe $h$, pump-chamber, and pipe $l$, into pipe D, and upwardly through the perforated false bottom, gravel, and ground quartz, &c., carrying therewith dirt and other impurities, to the top of the filtering-tank. By then turning the angular pipe $q$ to place its open end just below the top of the water in the filter-tank the same will be carried off through said angular pipe and the waste-pipe F, and as the muddy and otherwise impure water begins to descend the open end of the said angular pipe is depressed, being kept just below such level until all the water above the layer $d$ is carried off, and even if the top of said layer is somewhat below the line of the opening $n$ all the water above such layer may be withdrawn when the mouth of the angular pipe is sufficiently depressed, for, under the action of the withdrawal of water from the tank when the water stands above the level of the opening $n$, a siphonal action is had to withdraw water which may be below said level.

It will be observed that in the apparatus above described no artificial pressure is applied to force the water to be filtered through the filtering material.

The perforated false bottom $a$ need not necessarily be formed of an apertured metal plate, as shown, but may consist of a number of slabs of slate or rock or other suitable material, suitably supported from and above the bottom of the tank, and so placed together as regards compactness as to support the finer filtering material above, and yet, in point of non-integrity, to permit of the free passage therethrough of the filtered liquid.

What I claim as my invention is—

1. The combination, with a filter-tank, a cistern, and a conduit, D, leading thereto from the lower portion of the filter-tank, of a pump having its inlet in communication with said cistern, and having its outlet connected to an intermediate portion of said conduit D, and a valve in said conduit between said pump-outlet connection and the said cistern, substantially as described.

2. The combination, with a filter-tank provided with a perforated false bottom and a superposed filtering material, and an angular pipe rotatably mounted in said tank and having as a continuation thereof a waste-pipe, a cistern, and a conduit leading thereto from the tank-space below said false bottom, provided with a valve, of a pump by its inlet in communication with said cistern and by its outlet in communication with said lower tank-space, substantially as and for the purpose described.

3. In a filtering apparatus, in combination, a filter-tank provided with a perforated false bottom and a superposed filtering material, an angular pipe rotatably mounted in said tank, and having as a continuation thereof a waste-pipe, F, a supply-pipe, $e$, and a ball-cock, C, a cistern, B, and a pipe, D, leading thereto from the tank-space below said false bottom, provided with a valve, and a pump by its inlet in communication with said pipe D between the said valve and the cistern, and having a pipe, $l$, leading from its outlet to said pipe D between its valve and the filter-tank, all substantially as shown and described, and for the purpose set forth.

CHARLES H. DENISON.

Witnesses:
WM. S. BELLOWS,
G. M. CHAMBERLAIN.